(12) United States Patent
Regalia

(10) Patent No.: US 12,703,137 B2
(45) Date of Patent: Aug. 11, 2026

(54) SCREW AND TWIN-SCREW ASSEMBLY FOR USE IN ELASTOMER MIXTURE EXTRUDERS AND ASSOCIATED METHOD FOR EXTRUSION OF ELASTOMER MIXTURES

(71) Applicant: POMINI RUBBER & PLASTICS S.r.l., Rescaldina (IT)

(72) Inventor: Roberto Regalia, Rescaldina (IT)

(73) Assignee: POMINI RUBBER & PLASTICS S.R.L., Rescaldina (IT)

( * ) Notice: Subject to any disclaimer, the term of this patent is extended or adjusted under 35 U.S.C. 154(b) by 563 days.

(21) Appl. No.: 18/035,568

(22) PCT Filed: Nov. 5, 2021

(86) PCT No.: PCT/IB2021/060253
§ 371 (c)(1),
(2) Date: May 5, 2023

(87) PCT Pub. No.: WO2022/097076
PCT Pub. Date: May 12, 2022

(65) Prior Publication Data

US 2023/0405908 A1 Dec. 21, 2023

(30) Foreign Application Priority Data

Nov. 9, 2020 (IT) ........................ 102020000026669

(51) Int. Cl.
*B29C 48/00* (2019.01)
*B29C 48/41* (2019.01)
(Continued)

(52) U.S. Cl.
CPC ............ *B29C 48/595* (2019.02); *B29C 48/41* (2019.02); *B29C 48/69* (2019.02)

(58) Field of Classification Search
CPC ....... B29C 48/595; B29C 48/69; B29C 48/41; B29C 48/585; B29C 48/395
See application file for complete search history.

(56) References Cited

U.S. PATENT DOCUMENTS 3,983,862 A * 10/1976 Spriet ..................... B29C 48/92
366/97

FOREIGN PATENT DOCUMENTS

CN 102173004 A * 9/2011 ........... B29C 48/535

OTHER PUBLICATIONS

CN102173004A to Wang Machine Translation (Year: 2013).*

* cited by examiner

*Primary Examiner* — Anshu Bhatia

(57) ABSTRACT

A Screw for use in a twin-screw assembly of an elastomer mixture extruder with a threaded part with a single-start thread which defines at least three different sectors of the screw. The three sectors have an intake segment to capture the mixture fed from outside to push it downstream along the longitudinal direction, with a cross-section of the through-flow channel between adjacent flanks of the thread which is constant over at least two pitches or a rotation through 720 degrees of the thread. A transition sector which has a cross-section of the through-flow channel variable and smaller than the cross-section of the through-flow channel and is designed to cause an increase of the thrusting pressure acting on the mixture in transit in the longitudinal direction; and a high-pressure sector designed to cause the compression of the mixture to obtain a maximum pressure of the mixture.

20 Claims, 10 Drawing Sheets

Figure 1:
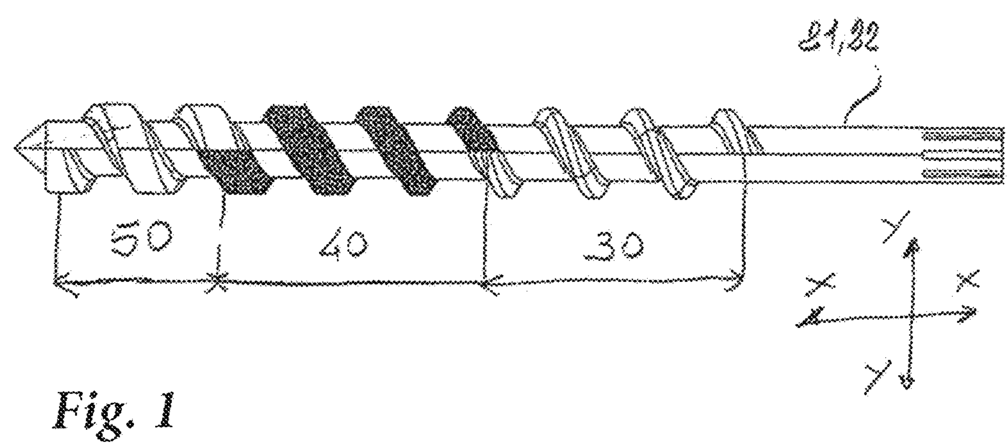

(51) Int. Cl.

| | |
|---|---|
| ***B29C 48/595*** | (2019.01) |
| ***B29C 48/69*** | (2019.01) |

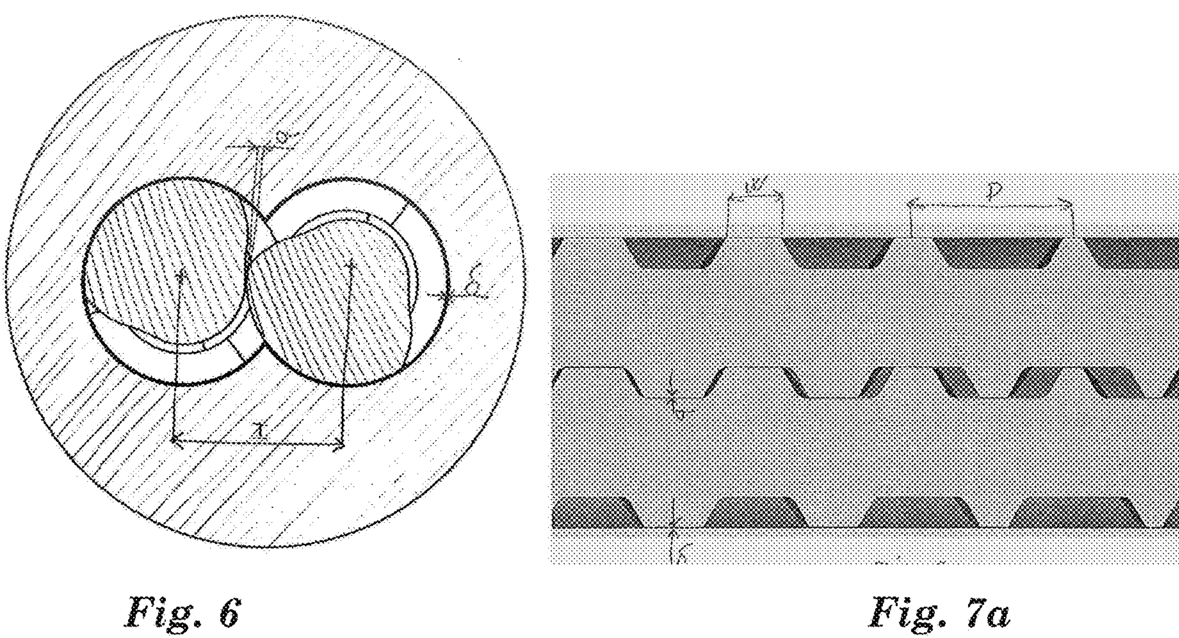
Fig. 6
Fig. 7a
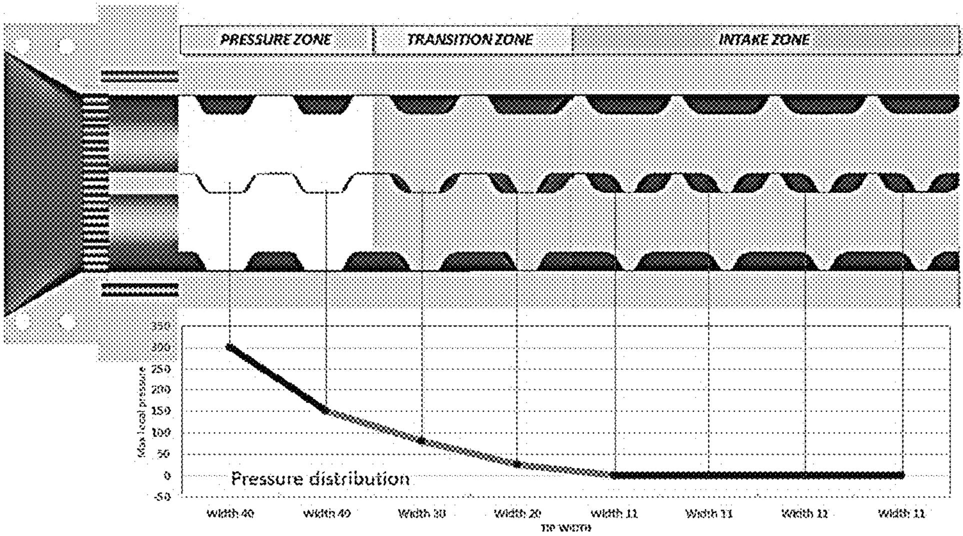
Fig. 7b

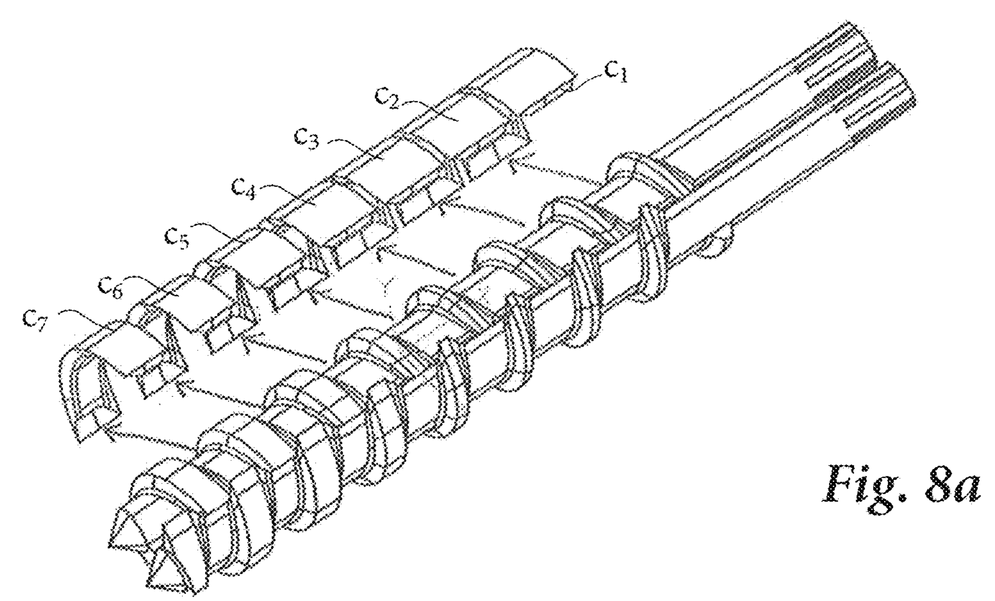
*Fig. 8a*
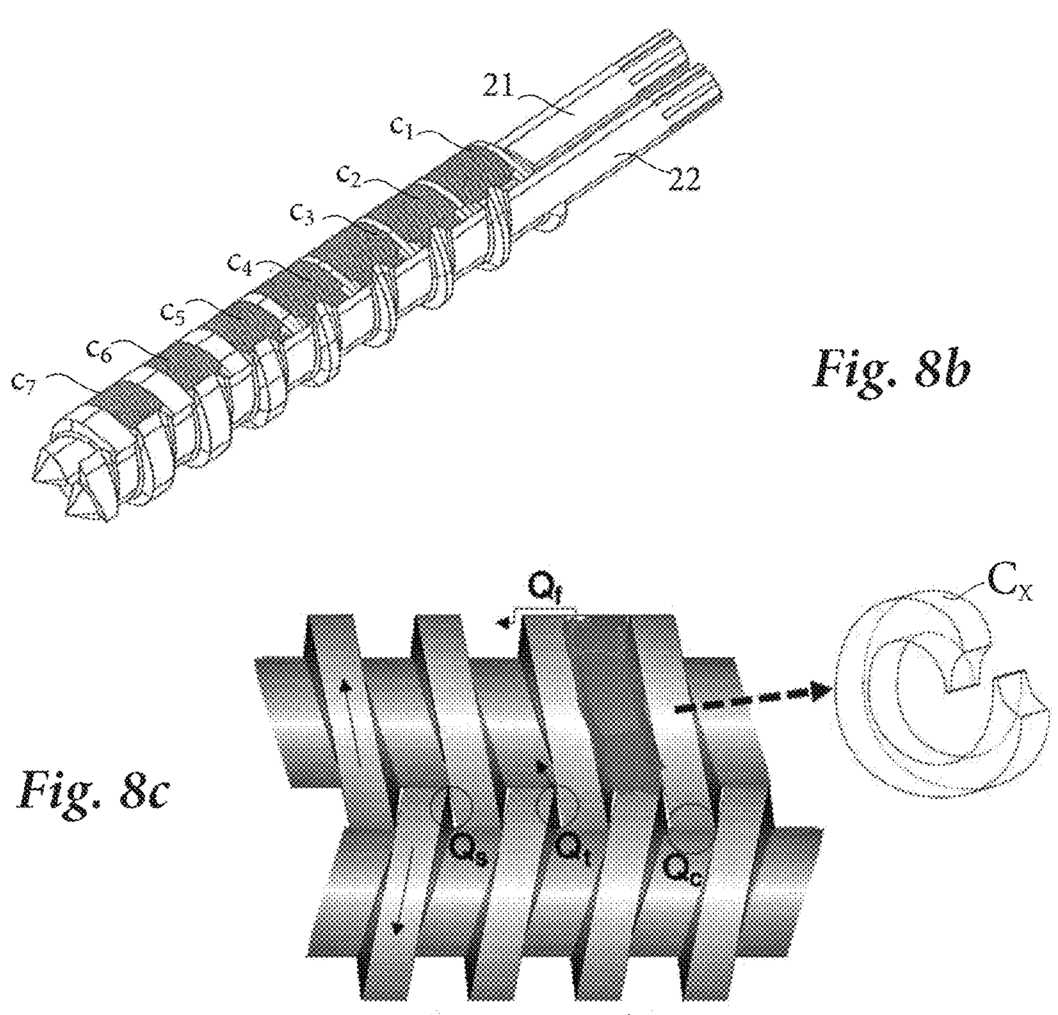
*Fig. 8b*
*Fig. 8c*

SCREW AND TWIN-SCREW ASSEMBLY FOR USE IN ELASTOMER MIXTURE EXTRUDERS AND ASSOCIATED METHOD FOR EXTRUSION OF ELASTOMER MIXTURES

The present invention relates to a threaded screw for use in twin-screw extruders with intermeshing screws for extrusion and/or filtration of elastomer-based mixtures, a twin-screw extruder with intermeshing screws for elastomer mixtures and a method for extruding elastomer-based mixtures.

It is known that elastomer materials, such as elastomer-based mixtures or compounds, are amorphous materials which have a glass transition temperature which is lower than the ambient temperature. In other words, elastomer materials at temperatures higher than or the same as the ambient temperature are highly viscous (viscoelastic) fluids which are already “rubbery” and therefore do not need to be melted for further processing. These materials, which are generally known as rubbers, include for example natural rubber, polybutadiene, polyisoprene, EPDM, NBR and SBR.

It is known that, in the technical sector relating to the production of elastomer-based compounds, there exists the need for “filtration” of the latter; with this operation the material being processed is made to flow, by means of suitable machinery, across a “filter” which is generally composed of one or more metal meshwork screens having a through-flow aperture of the meshes with suitable dimensions.

Typically this aperture has values ranging between 0.1 mm and 1 mm.

The purpose of this operation is to retain in the filter, and therefore eliminate from the compound, any possible “bodies” (impurities, particles of unmixed materials, etc.). which have dimensions greater than the through-flow aperture of the filter meshes.

A typical example is the compounds used to produce some visible profiles of cars such as, for example, window seals, for which the “perfect” surface appearance is an important feature that requires the elimination of any possible source of surface unevenness from the compounds used for this purpose.

Another sector in which filtration is important is that of the compounds used for the electric power supply cables which must be totally free from any impurities, in particular of a metallic nature.

In order for the compound to be filtered, it must be “pushed” or “forced” to flow through the filter, said operation being possible only if the compound is in a fluid state, namely has a “viscous” component which is predominant compared to the “elastic” component, this condition occurring when the compound is not crosslinked (not vulcanized) such that the polymer chains are not chemically bonded together.

In the non-crosslinked (so-called “raw”) state, the elastomer compound may be regarded as being a “fluid” which is able to “flow” or “freely move”. Even in this state the fluids in question have a viscosity which is relatively very high so that, during the flowing movement of the compound, sometimes undesirable temperature increases arise owing to the high friction inside the material.

Filtration must therefore be performed in conditions where the compounds are not crosslinked and where the compounds are absolutely unable to crosslink during filtration; consequently, filtration is greatly conditioned by two main factors: temperature and pressure.

An increase in the temperature, for example due to friction, must therefore be avoided during the whole process. The temperature must therefore be controlled by reducing the friction and/or by means of efficient dissipation of the heat generated.

The value of the pressure, which is required in order to feed the compound during processing, is also dependent on the speed of the “fluid” which crosses the filter. All other conditions being equal, in order to obtain an increase in the productivity and therefore flowrate, it is required to increase precisely this speed, consequently increasing the pressure and therefore the temperature.

It is also known that, during every process which involves elastomers which are subject to speed gradients, mechanical stresses arise inside the material being processed precisely because of these “gradients”, said stresses being able to cause in general an undesirable modification of the characteristics (for example, a reduction in the viscosity due to the mechanical breakage of the macromolecules).

From the point of view of rubber technology there therefore exists the problem of filtering elastomer-based compounds:

- under high flowrate/productivity conditions;
- limiting the increase in temperature of the compound to values which are relatively low and in any case such as to avoid any initial crosslinking;
- avoiding in the material any deterioration of a mechanical nature such as, for example, the undesirable breakage of the polymer chains.

From an industrial point of view, the filtration process must be in general such as to ensure:

- the economic sustainability of the processing operations, and therefore low cost thereof (i.e. machinery, labour and energy costs);
- easy and safety of the operations;
- simple layout of the plant and high degree of automation;
- “environmental” sustainability, i.e. with limited low-value emissions and processing waste.

In a different technical sector, relating to the processing of plastic compounds such as PVC and PP, different types of single-screw or multiple-screw extruders are known.

Plastic compounds have a glass transition temperature which is higher than the ambient temperature and must therefore be introduced into the extruder in the solid state and heated in the extruder so as to be “melted” and thus be able to be processed. The processes and the extruders designed for plastic materials are therefore incompatible with a correct processing of the elastomer compounds, where said heating must be avoided as far as possible. The two technical sectors are therefore considered to be very different from each other.

Known extruders for the processing of plastic materials with heating of the compound are for example described in US20150184655A1 which proposes the use of profiled constant-pitch screws and U.S. Pat. No. 2,508,495 which proposes using screws with thread pitch and width which vary continuously and progressively between a compound inlet and outlet.

GB1,359,672 describes a single-screw or twin-screw extruder with non-intermeshing screws for the processing of plastic materials in the solid state such as PET, with heating means for melting the plastic material, wherein the volume comprised between adjacent crests of the thread of a screw is varied by means of “lands” projecting from the bottom of the threading. The projecting lands do not allow the use of the screws in twin-screw extruders with intermeshing screws for the processing of elastomer compounds.

Such screws and extruder are not suitable for the extrusion and filtration of elastomer compounds since they have heating means (diathermic oil or electrical resistances) designed to heat the plastic material being processed to high temperatures necessary for melting (which would damage the elastomer material which on the contrary must not be melted) and non-intermeshing screws (resulting in play between the screws and therefore an excessive loss of flowrate such that sufficient pressure for extrusion/filtration of the elastomers cannot be reached). Moreover, the non-intermeshing screws operate along substantially separate and independent compound flow channels.

The apparatus for filtering elastomer compounds include known intermeshing twin-screw/multiple-screw extruders which are generally counter-rotating and comprise screws configured to generate a high pressure of the compound at the filter.

These known extruders, however, are subject to processing problems, since:

- a large quantity of air may remain trapped in the compound when it is loaded into the extruder at ambient pressure and may remain "trapped" in the compound until the filtration phase, resulting in a final product which has air bubbles inside it and is difficult/impossible to use in the downstream filtration processes;
- they have relatively high screw lengths for reducing the counter-flow opposing the main movement and obtaining the desired pumping effect. This length is however counter-productive for the purposes of controlling the increase in temperature of the compound since the heat generated by the friction between compound and screw surfaces and cylinders increases with an increase in the said surfaces.

Moreover, the greater the contact area with the compound, the greater the probability that the properties of the compound being processed will change significantly, precisely because of the friction between compound and surface.

The technical problem which is posed therefore is that of overcoming or at least reducing the drawbacks of the prior art, by providing in particular screws with an improved design suitable for application to a twin-screw extruder for elastomer mixtures, with axial discharging, in which they are arranged intermeshing, with parallel axis of rotation.

A particular problem which is posed is that of creating a geometry of the screws such that air present in the elastomer mixture can be evacuated before filtration thereof and/or the increase in temperature and the variations in physical properties of the mixture being processed can be reduced.

The technical problem which is posed is also that of providing a twin-screw extruder for elastomer mixtures which:

- has a loading system operating at ambient pressure; and/or
- does not require lubrication of the material being processed (i.e. without loss of mixture); and/or
- has a high productivity; and/or
- ensures improved heat exchange, i.e. less heat generation; and/or
- has a screw design such as to ensure high pressures only in the zone of interest and along a relatively short section; and/or
- is able to evacuate the air which remains trapped inside the mixture before it reaches the filtration zone; and/or
- does not cause any variation in the physical properties of the mixture.

In connection with this problem it is also required that the twin-screw assembly and/or extruder should be easy and inexpensive to produce and assemble, have small dimensions and be able to be easily installed also at any user location.

These results are obtained according to the present invention by a screw according to the characteristic features of claim 1 and by a twin-screw assembly according to claim 9.

The present invention relates furthermore to a method for extruding elastomer mixtures according to claim 20.

Figure 2:
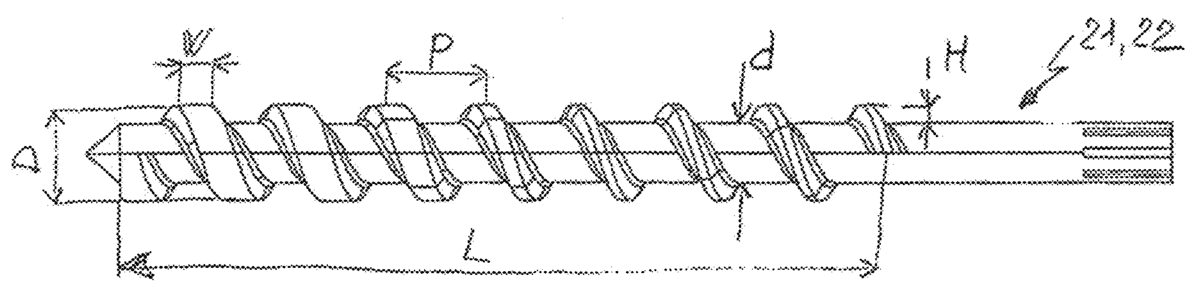
Figure 3:
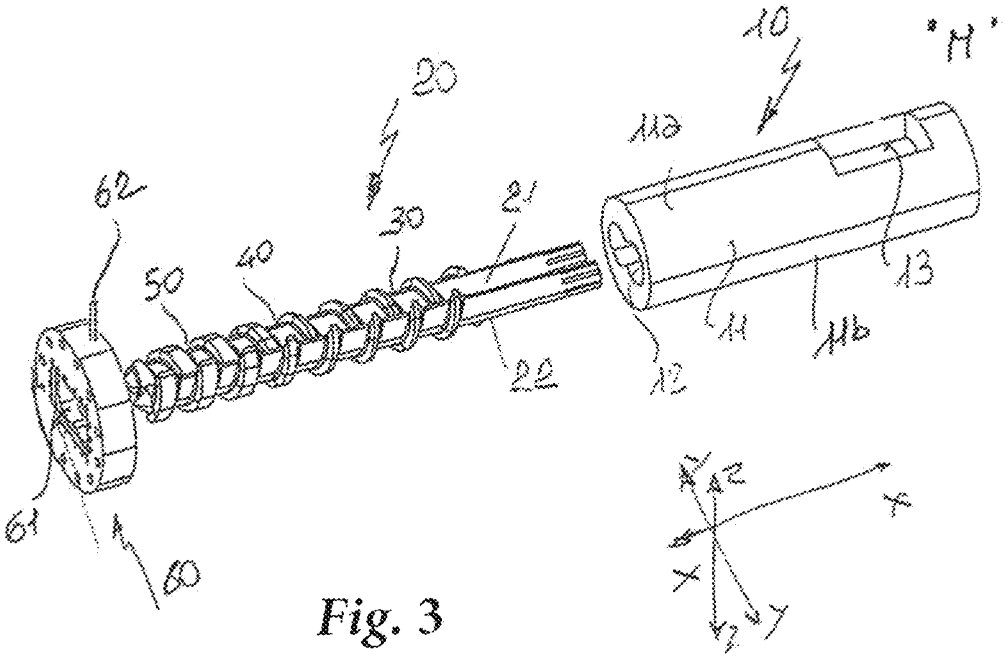
Figure 4:
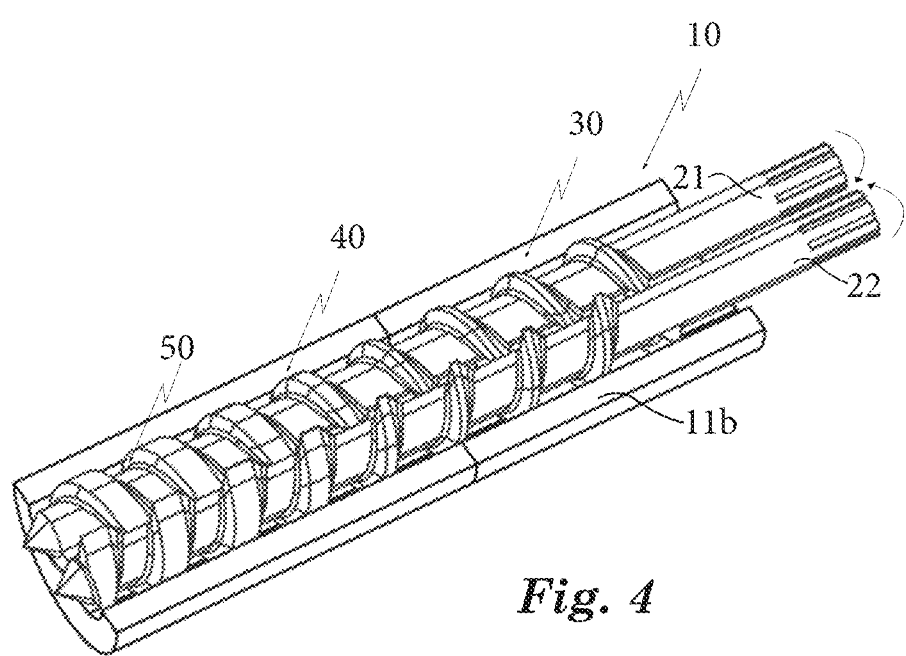
Figure 5:
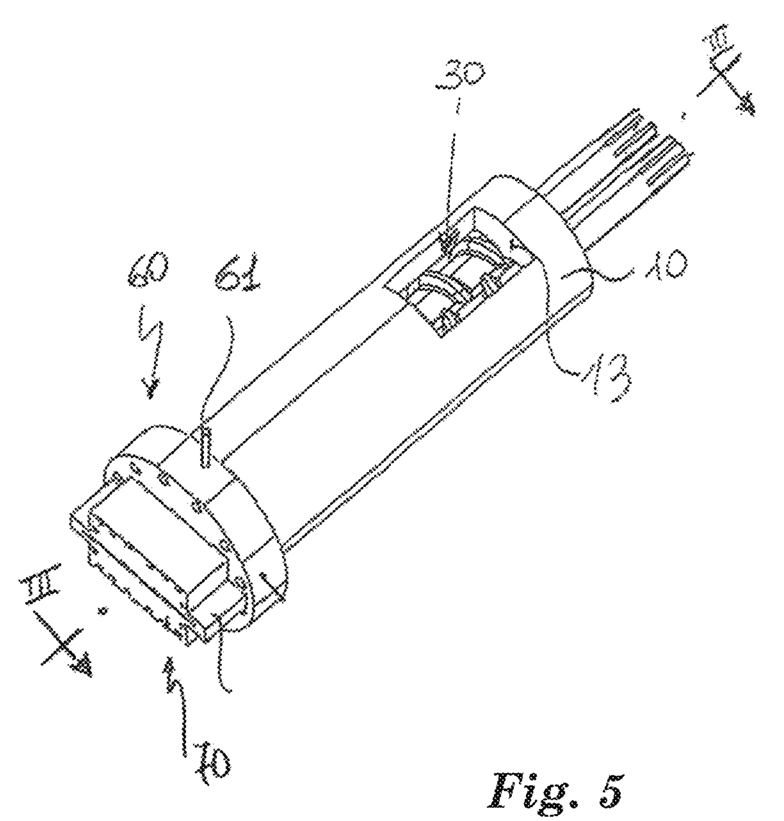
Figure 9:
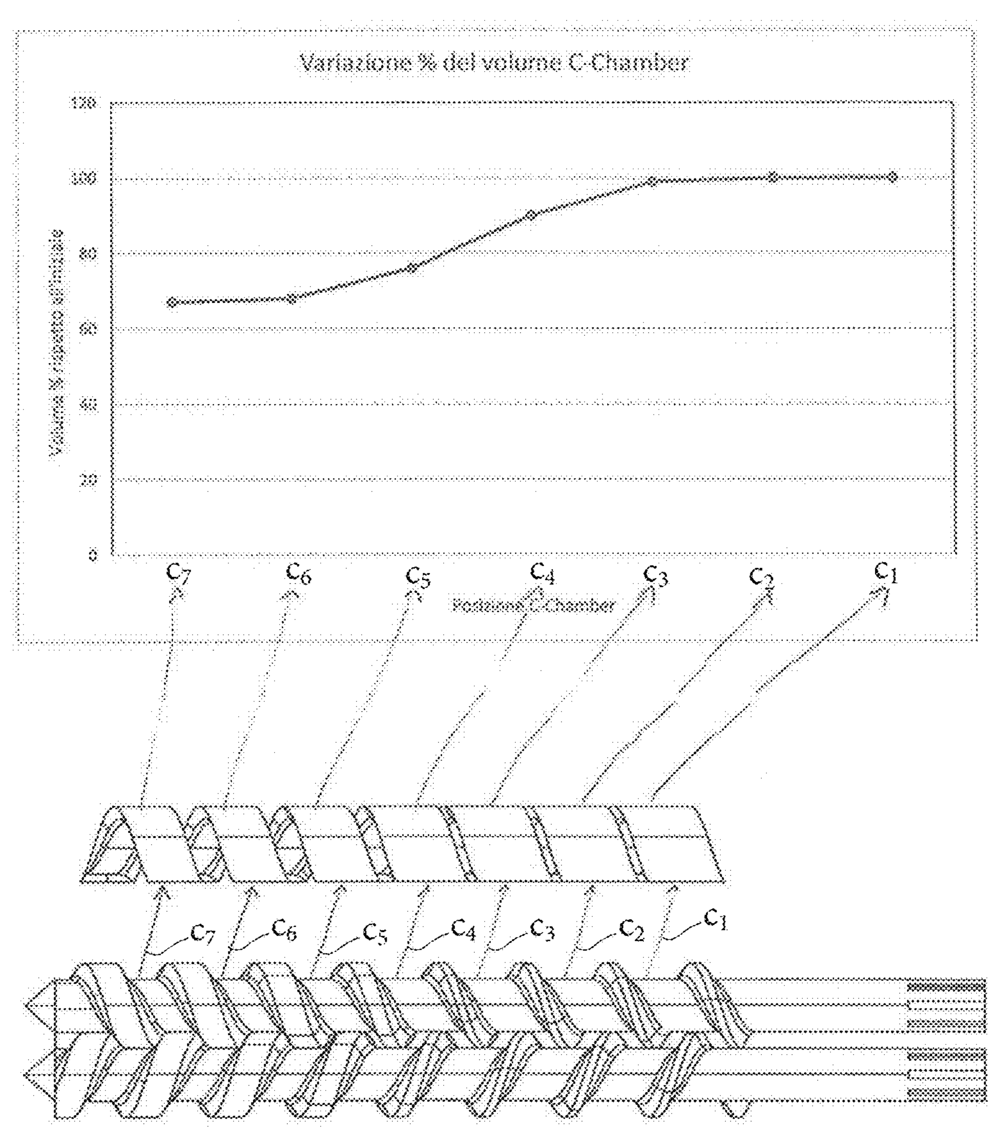
Figure 10:
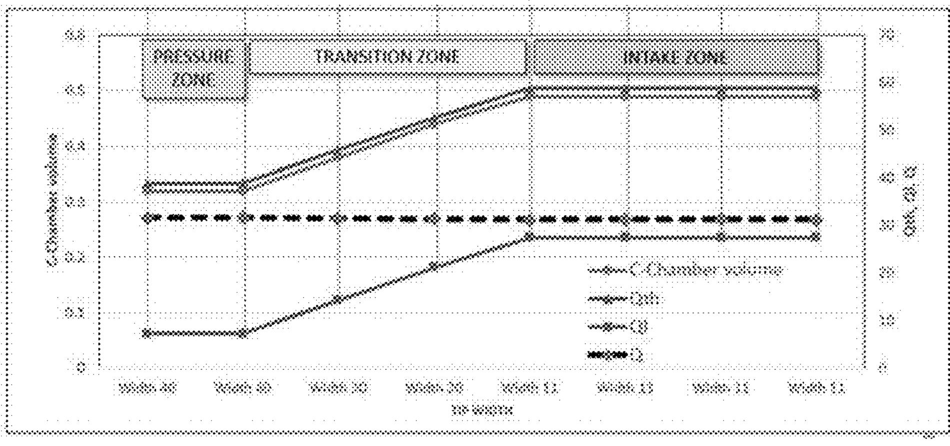
Figure 11:
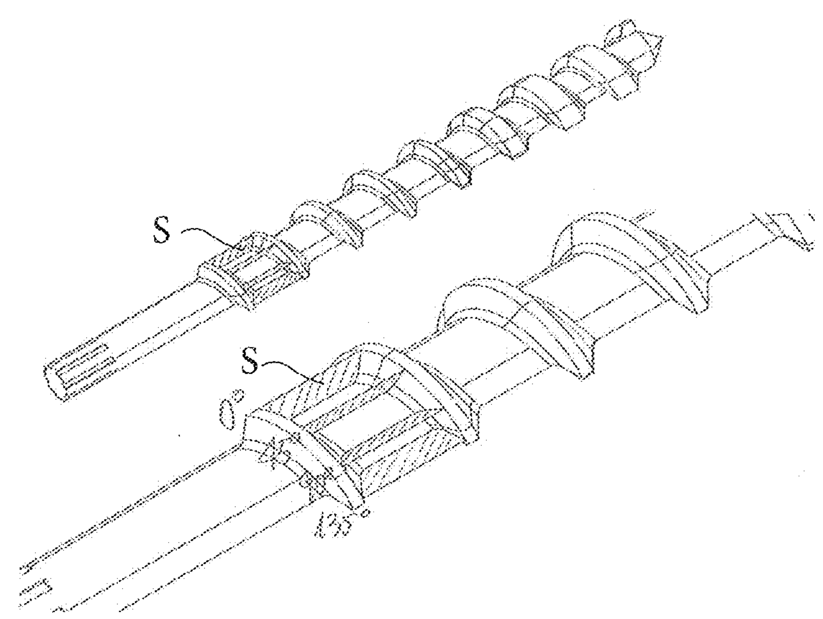
Figure 12:
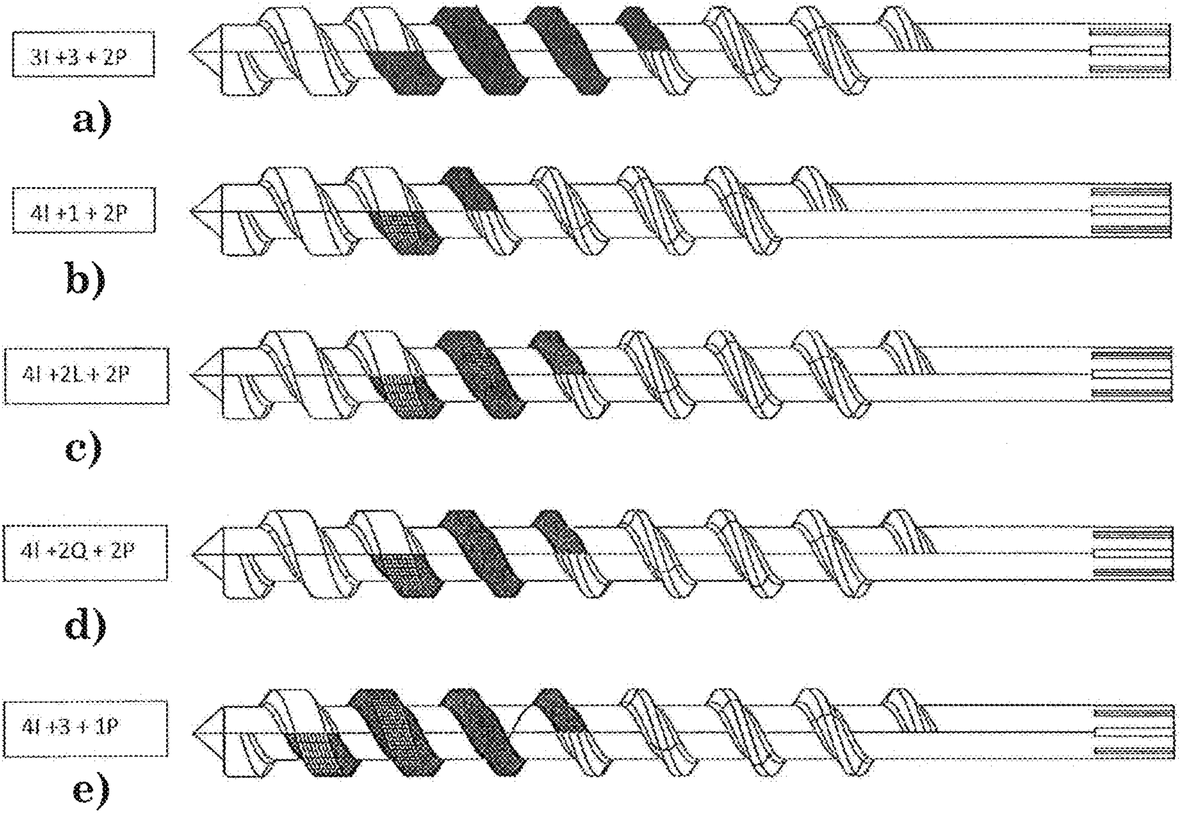
Figure 13:
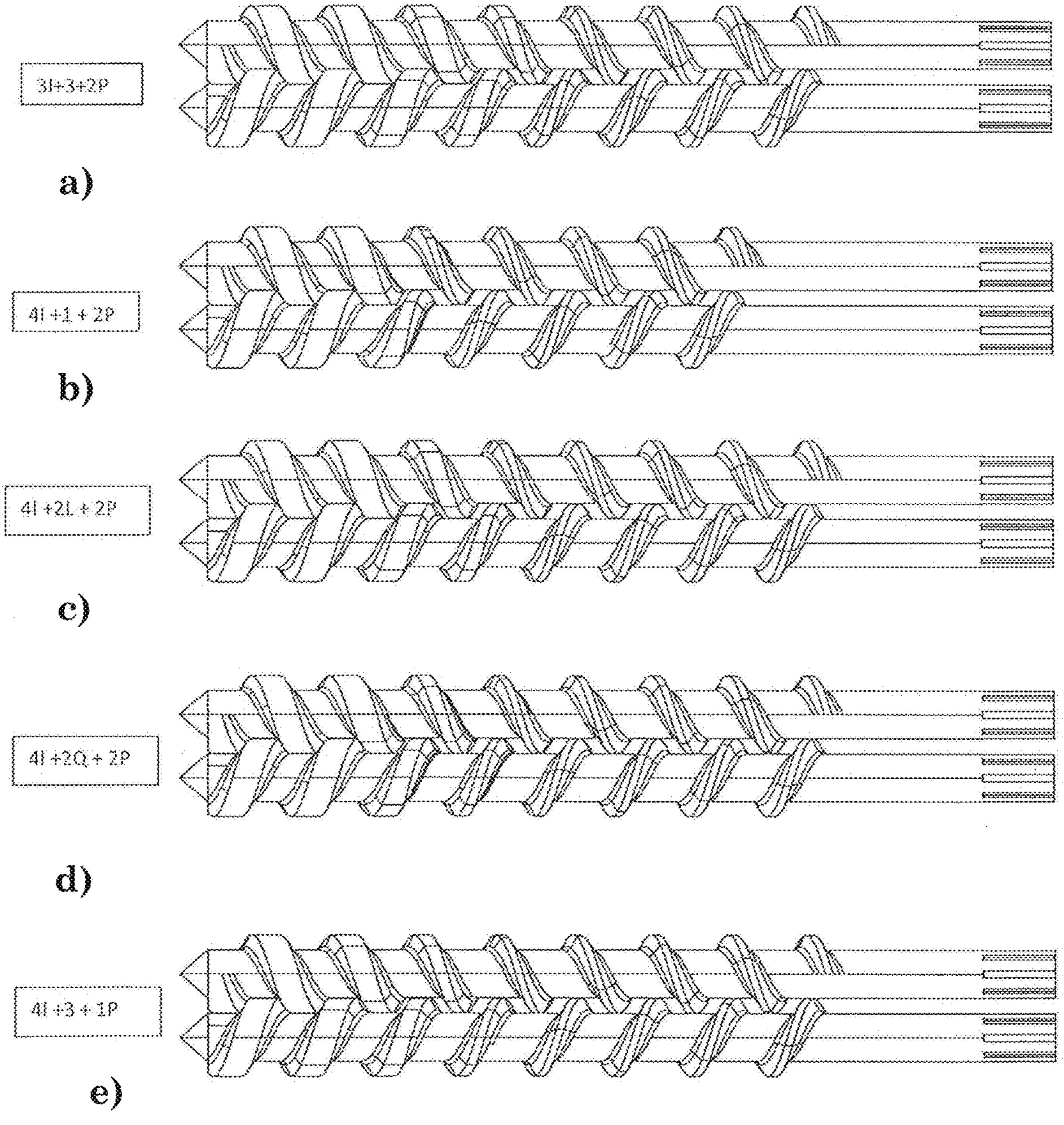

Further details may be obtained from the following description of non-limiting examples of embodiment of the subject of the present invention, provided with reference to the accompanying drawings, in which:

FIG. 1: shows a side view of a screw according to the present invention with, highlighted, three different longitudinal sectors of the screw;

FIG. 2: shows is a side view of the screw according to FIG. 1 in which various characteristic parameters are indicated;

FIG. 3: shows an exploded view of the twin-screw assembly according to the present invention;

FIG. 4: shows a perspective view of the twin-screw assembly according to FIG. 3 assembled and with the containing cylinder open;

FIG. 5: shows a perspective view of an extruder according to the present invention assembled together with the twin-screw assembly according to FIG. 3;

FIG. 6: shows a schematic cross-sectional view of the extruder according to the present invention with an indication of the play existing between the screws and between screw and cylinder;

FIGS. 7*a* 7*b*: show a schematic representation of the play existing between the screws with a corresponding diagram of the pressure obtained in the various sectors;

FIGS. 8*a*-8*c*: show perspective views and a partial side view of the pair of screws of the twin-screw assembly, in which the C-chambers are highlighted and the different flowrates involved are indicated;

FIG. 9: shows a diagram of an example of percentage variation of the volume of the C-chambers depending on the axial position of the chamber in the passages from the mixture intake zone to the high-pressure/output zone of the extruder;

FIG. 10: shows a diagram of an example of the progression of the actual flowrate and the variation in the volume of the C-chamber along the axis of rotation of the screws, in a preferred embodiment of the twin-screw assembly of the invention, with the local widths of the crest of the thread (W) indicated along the x-axis;

FIG. 11: shows schematic views of the cross-section of the through-flow channel of a screw according to the present invention upon variation of the angle of rotation of the thread;

FIGS. 12*a*-*e*: show examples of the geometry of a screw according to the invention;

FIGS. 13*a*-*e*: show examples of pairs of intermeshing and counter-rotating screws in a mirror arrangement, each formed by respective screws according to FIG. 12;

FIGS. 14A-14E: show examples of the characteristic progressions of the through-flow section of the twin-screw assembly according to FIG. 13, depending on the thread winding angle.

As shown and assuming solely for the sake of easier description and without a limiting meaning a set of three reference axes in a longitudinal direction X-X corresponding to the axial lengthwise dimension of the screws and direction of feeding of the mixture, transverse direction Y-Y corresponding to the radial widthwise dimension of a screw and, during use in the twin-screw assembly, parallel to the interaxial plane between the axes of rotation of the two screws; and vertical direction Z-Z orthogonal to the other two directions, a screw according to the present invention has a threaded part, the threading of which of the single-start type, with the thread raised with respect to a core, and defines three different longitudinal sectors, i.e. 30, 40 and 50 respectively.

With reference to FIGS. 2 and 6, below some characteristic parameters of a screw according to the present invention are described and will be referred to in the continuation of the description.

- P=pitch of the screw, measured as the axial distance between the centre line of two crests of the thread, arranged at a distance of 360° (complete rotation of the thread about the axis of the screw) with respect to each other. In the applications of the present invention, the pitch is generally constant along the whole screw and preferably congruent with the external diameter D;
- D=external diameter of the screw. Generally constant along the entire screw;
- d=internal diameter of the screw corresponding to the diameter of the core; d may vary along the length of the screw, but is preferably constant in the intake and high-pressure sectors, preferably also in the transition sector;
- Throughflow channel: free volume comprised between adjacent flanks of the thread (corresponding to the groove of the thread)
- Crest: top surface which joins two successive flanks
- Throughflow cross-section (of the channel): cross-section of the throughflow channel (or groove) along an axial plane passing along the axis of rotation of the screw;
- W=width measured along the axial direction of the crest of the thread;
- H=height of the mixture throughflow channel;
- L=length of the threaded part of the screw The profile of the thread may have preferably a trapezoidal or flattened triangular form.

For the description of a twin-screw assembly according to the present invention the following further definitions are also provided:

- I=interaxial distance between the screws of a screw assembly (FIG. 6);
- O'=distance between the crest of one screw and the core of the other screw (FIG. 6);
- δ=distance between the crest of one screw and the internal surface of the housing cavity of the containing cylinder (FIG. 6).
- C-chamber: C-shaped chamber defined by the free volume between screws inside the housing cylinder and comprised in a single rotation (in other words in a "pitch") of the thread of a single screw.
- throughflow channel (of the flow): free volume between screws inside the housing cylinder which defines the mixture flow channel. The throughflow channel for the flow is formed by the union of all the C-chambers of the two screws.

With reference to FIGS. 3 and 4 and having also defined an upstream part M corresponding to the zone for intake of the mixture to be filtered and a downstream part V corresponding to the output zone for the filtered mixture, a twin-screw assembly according to the invention comprises substantially:

- a "cylinder" 10 with a body 11 having a top upstream opening 13 suitable for the intake of the mixture and downstream axial outlet opening 12; conveniently the cylinder may be divided into two half-cylinders 11*a*, 11*b* in order to facilitate assembly thereof.

The cylinder has a suitable internal cavity with a form suitable for housing two screws, 21 and 22 respectively, arranged with their axes of rotation parallel and intermeshing and counter-rotating during use.

The output zone 60 is arranged at the downstream end of the twin-screw assembly, said zone comprising a filtration zone 70 (FIG. 5) into which the mixture is made to pass through the filter (not shown) in the feeding direction towards the discharge outlet.

For the sake of easier description, the present description will refer always to twin-screw assemblies in which the screws are in a mirror arrangement with respect to each other, although it is also possible to envisage different configurations of the two intermeshing and counter-rotating screws of the twin-screw assembly according to the invention.

The cylinder and screw assembly defines three different sectors in the longitudinal direction (FIG. 3) of the twin-screw assembly corresponding to the three longitudinal sectors of the threaded parts of the screws, i.e.:

- an intake, or upstream, sector 30, where the mixture is introduced at ambient pressure into the cylinder 10 and "captured" by the rotation of the screws 21,22;
- an intermediate or transition sector 40, downstream of the intake sector 30, where the action of the two screws 21,22 causes a gradual increase in the thrusting pressure pushing the mixture downstream;
- a high-pressure sector 50 situated between the transition sector and the following output zone 60.

As shown in FIG. 7 and as will become clearer below, along the mixture intake sector 30 there is a large amount of play between the screws so as to create a large "free" volume able to facilitate the entry of large volumes of mixture, along the transition sector 40 there is play between the screws which gradually becomes smaller, and along the high-pressure sector 50 there is play between the screws which is very small, i.e. less than that of the intake zone 30 and transition zone 40, so as to create a small throughflow channel or free volume which is able to minimize the counter-flow and achieve the high pressure necessary for filtration.

The three longitudinal sectors of the screws may be defined depending on the variation of the throughflow channel which is formed in the free volume inside the cylinder, with respect to the angle of rotation.

In this context reference will be made also to the known concept of "C-chambers" (FIGS. 8*a*-8*c*) used to identify the channel Cx (FIG. 8*c*) with a free volume in the form of a C defined between the screws of a pair of intermeshing screws and comprised in a single rotation (in other words in a "pitch") of the thread of a single screw.

In detail and according to the present invention, the twin-screw assembly according to the present invention is characterized by a single throughflow channel which comprises from upstream to downstream at least three different sectors (20,30,40) of the screw along the longitudinal direction (X-X), which comprise:

- the intake sector (30) which has an ample volume of the C-chambers $c_1$-$c_3$ forming the flow channel, which is optimized to capture the mixture fed from the outside and to push it downstream along the longitudinal direction (X-X) and which remains constant over at least two pitches of the thread of each screw;

the transition sector (40), downstream of the intake sector, which has a variable volume of the C-chambers $c_1$-$c_3$, decreasing (in the direction of advancing movement X-X) and less than the volume of the C-chambers of the intake sector 30 so as to produce, amongst other things, an increase of the thrusting pressure acting on the mixture in transit in the longitudinal direction X-X, and evacuation of the air which remains trapped when the mixture is loaded;

the high-pressure sector 50 which is arranged downstream of the transition sector 40 and has a volume of the C-chambers $c_6$,$c_7$ forming the throughflow channel, which is constant over at least one pitch and smaller than the volume of the intake and transition sectors; this sector 50 which has C-chambers with a minimum volume is therefore optimized to compress the mixture and obtain a maximum pressure of the mixture in the output zone According to preferred embodiments of the present invention, configurations of the geometry of the three longitudinal sectors of each screw have been developed so as to create laws of variation of the throughflow channel, and therefore of the C-chambers, which are such as to ensure an optimized configuration for the specific function for which each sector is intended. In particular, the geometries are such as to obtain at the same time a maximization of the intake performance at atmospheric pressure, corresponding to the intake sector for which C-chambers with a high volume, hence low crest width W, are required, with consequent maximization of the flowrate, and a maximization of the compression of the mixture in the high pressure sector 50 arranged immediately upstream of the filtration zone.

In particular, in preferred embodiments of a screw for use in a twin-screw assembly according to the invention the intake sector has the following parameters:

W=(0.025-0.20)D, constant for at least two, three or four pitches, preferably (0.05-0.10)D;

P constant, preferably =D;

O'=(0.0025-0.030)D, preferably (0.005-0.015)D

δ=(0.0025-0.030)D, preferably (0.005-0.015)D

H=(0.3-0.8)D, preferably (0.54-0.6)D

Li axial length of intake zone)=(3-4)D

The preferred geometric variables of the screws in the intake sector are such that, in a single-thread screw:

the relatively low W value and high H value allow a maximum volume of C-chambers to be obtained;

The low values of O' and δ and axial transportation value (P=D) allow maximization of the performance for both mixture “capture” at the extruder input and mixture feeding.

In order to generate the required pressures only in the high-pressure sector immediately close to the filter, so as to reduce the generation of heat and counter-flow losses, the C-chambers in this zone have a constant volume less than in the other zones of the screw, so that the play is mechanically as small as possible.

In detail, the high-pressure sector preferably has the following parameters:

W=(0.3-0.4)D, preferably (0.33-0.37)D, constant for one or two pitches;

P constant, preferably =D;

σ=(0.0025-0.020)D, preferably (0.005-0.015)D

δ=(0.0025-0.030)D, preferably (0.005-0.015)D;

H=(0.3-0.8)D, preferably (0.54-0.6)D;

Lp (axial length of high-pressure sector)=1-2 D;

Generally constant throughflow cross-section

The geometric variables of the high-pressure zone are such that:

The low values of δ and a and high value of W maximize the pumping performance, i.e. maximize the ratio between the main flow (in the feeding direction) and counter-flow opposing the main movement;

the values of P=D, with high H, maximize at the same time the flowrate.

Therefore, the screws of the twin-screw assembly according to the invention may advantageously be configured so as to obtain simultaneously: high pressures in the sector 50 close to the filter, where the play between screws and between screw and cylinder are relatively very small (in order to reduce the counter-flow opposing the main movement; and high capture and flowrate of the mixture in the intake zone, owing to the high free volumes, i.e. the space which can be potentially filled by the mixture.

In view of the different performance features required by said two sectors, i.e. the upstream/ambient-pressure intake sector and downstream/high-pressure sector, the transition sector between the intake sector, with low pressure and high volume of the C-chambers, and the high-pressure sector with low volume of the C-chambers upstream of the filtration zone, is advantageously configured with a variable C-chamber volume, in particular so as to:

eliminate the air which remains trapped in the mixture when it enters into the extruder;

avoid sudden and unexpected variations in the geometry which are such that they generate potential lack of uniformity in the material being processed and potential local pressure peaks.

Therefore, preferably, the transition sector 40 has a decreasing volume of the C-chambers. In particular, the cross-section of the mixture throughflow channel preferably decreases in the direction of advancing movement of the mixture according to a law of variation which is substantially continuous, in particular at least partly approximately linear and/or quadratic and/or of an order greater than 2.

Preferably, the variation of the mixture throughflow channel in the transition sector is obtained with a geometry which varies the crest width W of the screw thread, while other parameters of the screw may reman constant in the transition sector.

According to particularly preferred geometries of the screws for use in the twin-screw assembly according to the present invention, the transition sector has the following parameters:

W=is variable continuously between the W value of the intake sector and the W value of the high-pressure sector P constant, preferably =D;

σ=(0.0025-0.030))D, preferably (0.005-0.015)D

δ=(0.025-0.030)D, preferably (0.005-0.015)D;

H=(0.3-0.12)D, preferably (0.54-0.6)D;

Lt (axial length of transition sector)=1-3D

A gradual transition between the intake performance and the high-pressure performance is thus obtained. The variation of the throughflow channel may follow suitable laws, such as to optimize the required performance.

It is particularly preferable to limit the axial length of the threaded part of the screw so as to obtain a ratio L/D≤8, namely short length, in order to limit the undesirable temperature increases typical of long extruders, such that L/D>10 known in the art.

In accordance with the aforementioned laws, screws with a geometry obtained on the basis of the law of variation of the internal channel and designed to define the three said different processing zones are provided. With reference again to FIG. 8*c* and the mixture throughflow channel defined by the C-chambers of the twin-screw assembly, it emerges that, if there were no flowrate losses, the theoretical maximum flowrate $Q_{th}$ of a twin-screw extruder with single start thread, intermeshing and counter-rotating screws in a mirror arrangement would be equal to the volume Vc of two C-chambers multiplied by the speed of rotation N of the said screws:

$$\text{Maximum theoretical flowrate:} Q_{th}=2\cdot V_c\cdot N$$

$V_c$=C-chamber volume

N=rpm

In reality it is known, moreover, that owing to the loss of flowrate due to the play between the screws and between the screw and cylinder, and the counter-flow opposing the main movement, the theoretical maximum flowrate is never reached and that, the higher is the play, the higher are the flowrate losses which also depend on the progression of the pressure between the loading zone and the filtration zone.

With reference still to FIG. 8*c* the main flowrate losses are as follows:

$Q_c$=calendar leakage $Q_t$=tetrahedral leakage $Q_f$=flight gap leakage $Q_s$=side gap leakage The resultant effective flowrate Q is therefore obtained from the algebraic sum of the theoretical maximum flowrate (Qth) which is directly derived from the volume of the C-chambers) and the total flowrate loss (Ql) which is due to the play between the screws and between screw and cylinder and the counter-flow due to the pressure:

Total loss of flowrate/counter-flow:

$$Ql=Qf+Qs+Qt+Qc$$

$$\text{Effective flowrate:} Q=Q_{th}-Ql$$

According to preferred configurations of the twin-screw assembly, said assembly is configured so as to obtain a substantially constant effective flowrate Q along the longitudinal direction of advancing movement of the mixture from the input sector to the end of the high-pressure sector and, consequently, an efficiency calculated as the ratio $Q/Q_{th}$, which gradually increases towards the output zone.

A particular preferred example of this configuration is illustrated in FIG. 9 which shows the geometry of the counter-rotating screws and the law of variation of the associated C-chambers which form the mixture flow channel; the corresponding effective flowrate $Q=Q_{th}-Q_l$ through the flow channel, which is constant in the extrusion direction, is indicated by means of a black broken line in the diagram of FIG. 10.

FIG. 11 shows a schematic view of the cross-section S of the through-flow channel upon variation of the angle of rotation of the thread of a screw according to the present invention.

Further preferred embodiments of screws according to the present invention and corresponding twin-screw assemblies are respectively shown in FIGS. 12, 13.

The variation in the cross-section of the mixture throughflow channel for the corresponding twin-screw assemblies is shown in FIG. 14.

In greater detail, the screw of FIG. 12*a* has a cross-section of the throughflow channel which is constant (and maximum) over three 360° rotations (3l) of the thread (three pitches) in the intake sector 30, decreases over three rotations of the thread in the transition zone and is constant (minimal) over two pitches (2P) in the high-pressure zone.

Figure 14A:
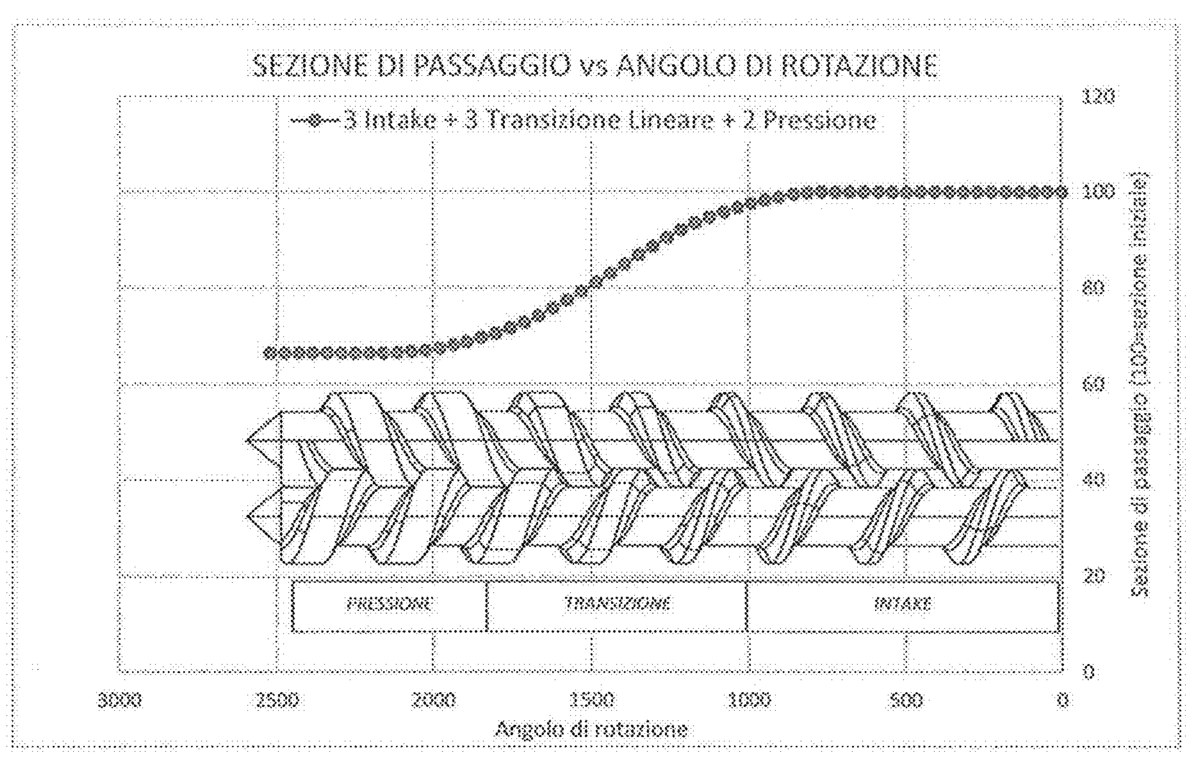

The C-chambers and the cross-section of the mixture throughflow channel for the twin-screw assembly according to FIG. 13*a* follow a similar law of variation, as illustrated in FIG. 14*a*.

Figure 14B:
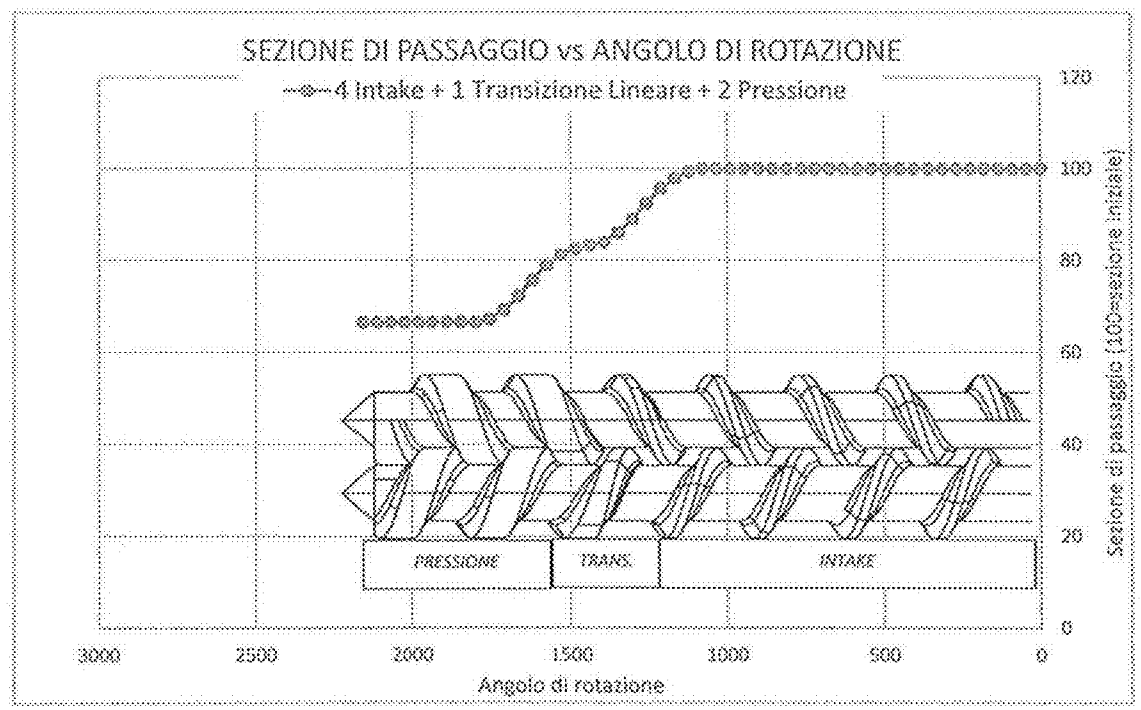

The screw of FIG. 12*b* has a cross-section of the through-flow channel which is constant (and maximum) over four 360° rotations of the thread in the intake sector 30, decreases over one 360° rotation of the thread in the transition zone and is constant (minimal) over two pitches in the high-pressure zone. The C-chambers and the cross-section of the mixture throughflow channel for the twin-screw assembly according to FIG. 13*b* follow a similar law of variation, as illustrated in FIG. 14*b*.

Figure 14C:
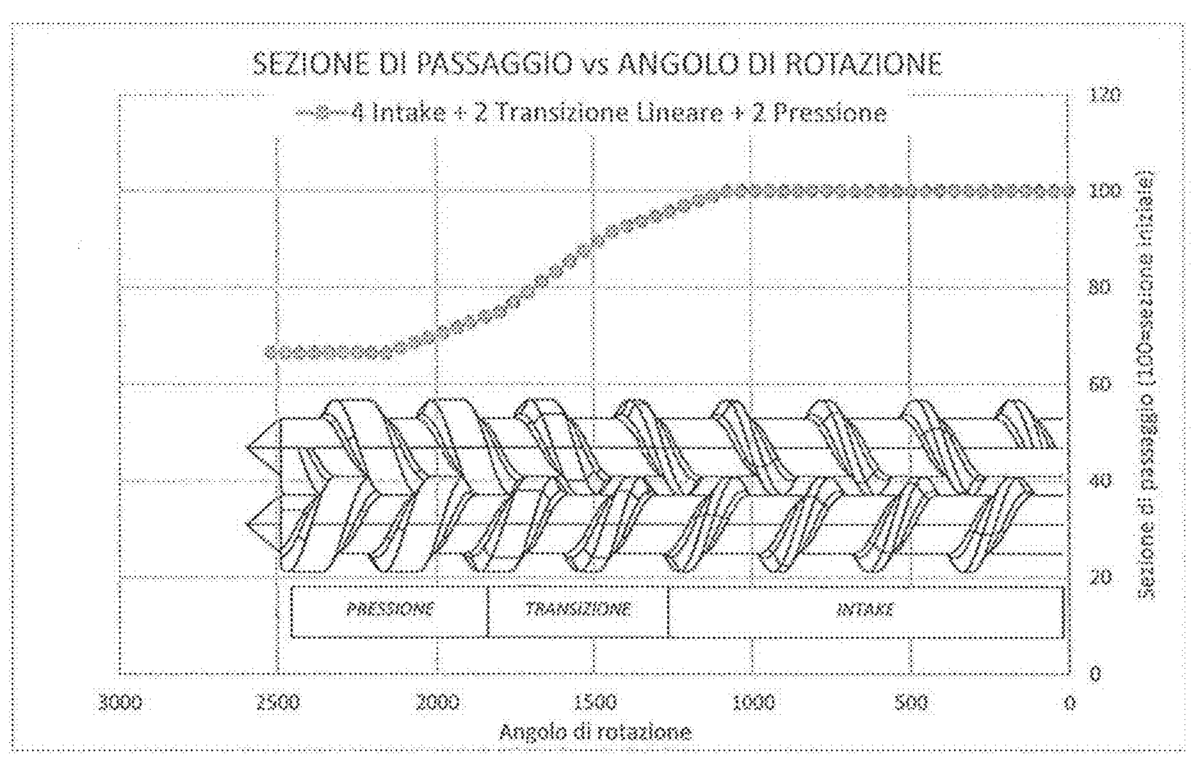

The screw of FIG. 12*c* has a cross-section of the through-flow channel which is constant (and maximum) over four 360° rotations of the thread in the intake sector 30, decreases over two pitches (2L) of the thread in the transition zone and is constant (minimal) over two pitches in the high-pressure zone. The C-chambers and the cross-section of the mixture throughflow channel for the twin-screw assembly according to FIG. 13*c* follow a similar law of variation, as illustrated in FIG. 14*c*.

Figure 14D:
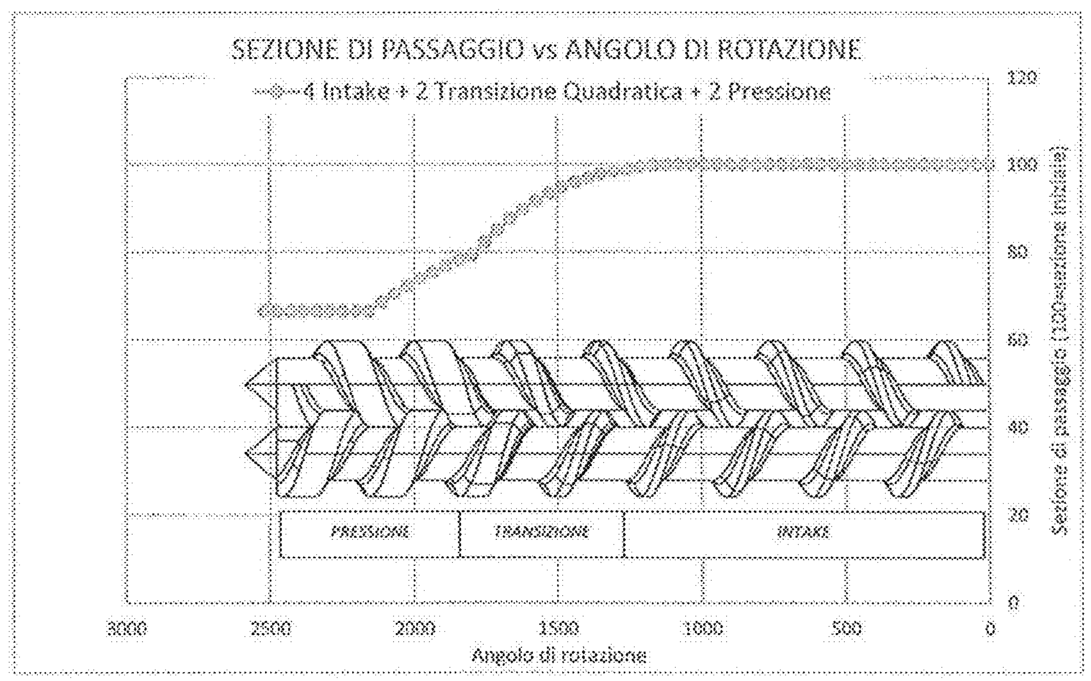

The screw and the twin-screw assembly in FIGS. 12*d*, 13*d*, 14*d* are similar to those in FIGS. 12*c*,13*c*,13*d*, but the variation of the cross-section in the transition sector 40 in this case has a decreasing quadratic progression (2L) The screw of FIG. 12*e* has a cross-section of the throughflow channel which is constant (and maximum) over four 360° rotations of the thread (three pitches) in the intake sector 30, decreases over three rotations of the thread in the transition zone and is constant (minimal) over a 360° rotation of the thread in the high-pressure zone 50.

Figure 14E:
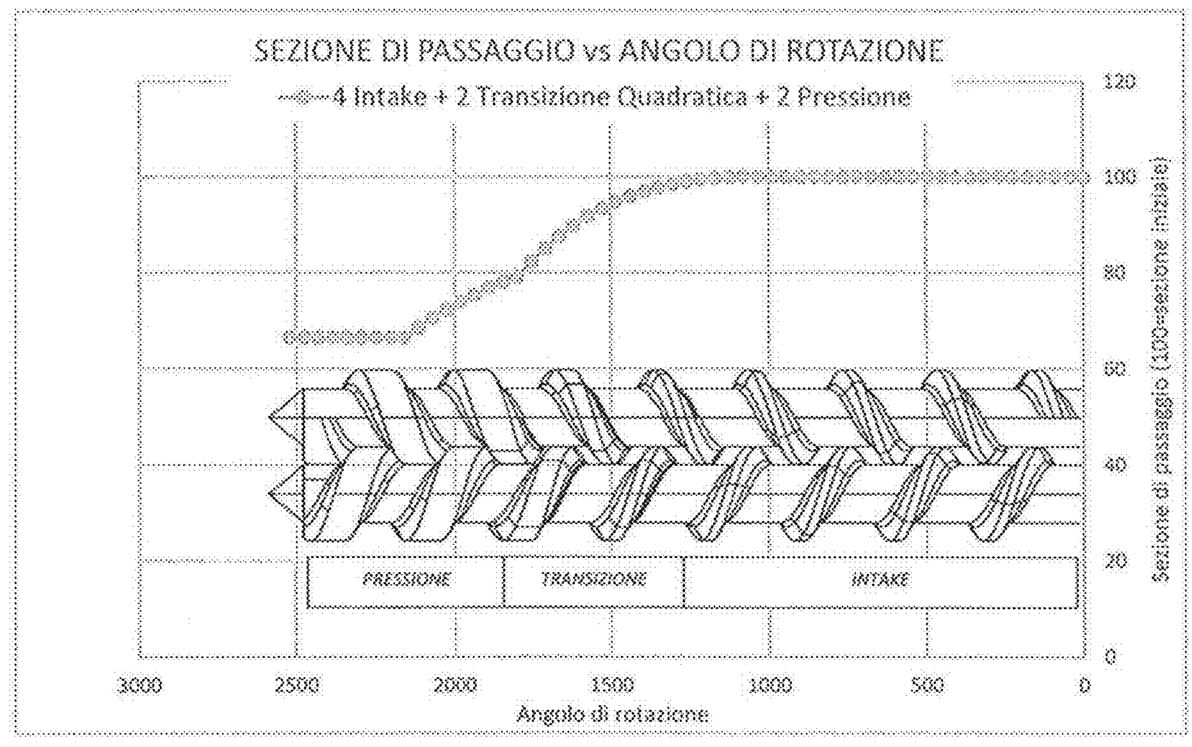

The C-chambers and the cross-section of the mixture throughflow channel for the twin-screw assembly according to FIG. 13*e* follow a similar law of variation, as illustrated in FIG. 14*e*.

Advantageously, all the preferred examples shown, which are only some of the possible geometries, are able to keep the length of the threaded part of the screw within the ten—preferably eight—thread pitches.

In addition to this it is possible to:

- reach high pressures (even higher than 300 bar) with a screw length and a limited ratio L/D=Length/Diameter of the transition zone+pressure zone equal to 5, and high flowrates, therefore allowing the filtration also using filters which have very fine meshes (<0.1 mm);
- control and limit the increase in temperature of the mixture also high at rpms and flowrates;
- use relatively low driving torques since the screw is short;
- prevent significant flexing of the screws, preventing them from coming into contact with the cylinders;
- evacuate, through the intake opening, the air which may remain trapped when the mixture enters.

In preferred embodiments of the extruders according to the invention it is envisaged that the extruded mixture filtration/output section 70 comprises a filter-holder plate 71 coupled to the connection flange 60 and closed by a shaped head 73.

A "filter" (not shown here), generally consisting of a one or more metal meshes, is placed between the connection flange 61 and the filter-holder plate 71; the mixture is forced by the thrust produced by the rotation of the screws to flow across this filter which retains any impurities which are larger than the mesh aperture.

Preferably, one or more pressure and temperature sensors 61 are placed in the flange 60 and allow constant monitoring of the pressure and temperature of the mixture being processed, so as to obtain full control over the filtration step.

FIGS. 6,7 show cross-sections through the housing of the screws 21 and 22 inside the cylinder 10.

It can be seen how the play δ between the crest of each screw and the cylinder 10 and the play σ between the crest of one screw and the core of the other screw are very small and in any case such as to ensure simultaneously a pumping action and the absence of contact between screws and cylinder.

It is therefore clear how the screws, the twin-screw assembly according to the invention and the extruder provided with this twin-screw assembly provide a solution to the problems of the prior art, resulting in:

- the absence of further auxiliary apparatus for loading at ambient pressure the elastomer mixture to be filtered;
- the generation of high pressures in a small defined zone, limiting the increase in temperature, which advantageously may be kept lower than the vulcanization temperature of the elastomer mixture (generally less than 100-120° C.);
- optimization of the overall performance owing to three zones each dedicated for a precise task and configured in relation thereto;
- the absence of localized temperature peaks owing to the particular geometry of the transition zone;
- effective removal of the air trapped in the mixture when it is introduced into the intake zone.

Although described in connection with a number of embodiments and a number of preferred examples of implementation of the invention, it is understood that the scope of protection of the present patent is determined solely by the claims below.

The invention claimed is:

1. A screw (21;22) adapted for use in a twin-screw assembly with intermeshing screws of an elastomer mixture extruder, comprising a threaded part with a thread and which defines at least three different sectors (30,40,50) of the screw along a longitudinal direction (X-X) of axial extension from upstream to downstream, wherein the at least three sectors comprise:

an intake sector (30), which is adapted to capture and push a mixture downstream along the longitudinal direction (X-X) and which has a cross-section(S) of a throughflow channel comprised between adjacent flanks of the thread which is constant over at least two pitches or a rotation through 720 degrees of the thread;

a transition sector (40), downstream of the intake sector, which has a cross-section(S) of the throughflow channel which is variable and smaller than the cross-section of the throughflow channel of the intake sector and is designed to cause an increase in thrusting pressure acting on the mixture in transit in the longitudinal direction (X-X);

a high-pressure sector (50), downstream of the transition sector, which has a cross-section of the throughflow channel which is minimal and constant over at least one pitch and designed to cause compression of the mixture to obtain a maximum pressure of the mixture, wherein the thread of said threaded part along each sector of the at least three sectors is a single-start thread and a geometry of the screw in the high-pressure sector (50) has a crest width (W) of a thread crest where W=(0.3-0.4)D, and is constant over one or two pitches, where D is an external diameter of the screw.

2. The screw according to claim 1, wherein the intake sector has the cross-section of the throughflow channel and/or the crest width (W) of the thread crest which is constant over at least three pitches.

3. The screw according to claim 1, wherein, in the intake sector, the geometry of the screw has:

a pitch (P) of the thread which is constant; and/or a height (H) of the throughflow channel is H=(0.3-0.8)D; and/or an axial length (Li) of the intake zone is Li=(3-4)P and/or (3-4)D.

4. The screw according to claim 1, wherein, in the high-pressure sector (50), the geometry of the screw has:

the crest width (W) is W=(0.33-0.37)D, constant over one or two pitches; and/or a pitch (P) is constant;

where D is the external diameter of the screw.

5. The screw according to claim 1, wherein the screw has a constant pitch over an entire length of the threaded part.

6. The screw according to claim 1, wherein the screw has a length of the threaded part less than or equal to 10 D, where D is the external diameter of the screw, and/or less than or equal to 10 P, where P is a pitch of the thread.

7. The screw according to claim 1, wherein, in the transition sector, variation of the throughflow channel for passage of the mixture is obtained with a geometry which varies the crest width (W) of the screw thread.

8. The screw according to claim 7, wherein, in the transition sector, the crest width W is variable continuously between a minimum value of W, corresponding to a crest width of the intake sector, and a maximum value corresponding to a value of W of the high-pressure sector; wherein the geometry of the screw in the transition sector has:

a constant pitch (P); and/or a height (H) of the throughflow channel is constant and/or comprised of H=(0.3-0.12)D; and/or an axial length of transition sector is Lt=(1-3)D;

where D is the external diameter of the screw.

9. A twin-screw assembly (10,20) for elastomer mixture extruders, comprising:

two screws (21,22) with a threaded part having a single-start thread, which are arranged intermeshing and counter-rotating with parallel longitudinal axes of rotation (X-X) inside a cylinder (10), so as to form a throughflow channel for passage of the mixture flow consisting of a union of a plurality of C-chambers (Cx), each defined by a free volume inside the cylinder (10) and comprised in a single rotation of the thread for a single screw, the twin-screw assembly being provided with an upstream opening (13) for the intake of mixture into the throughflow channel, wherein the throughflow channel for passage of the flow comprises, from upstream to downstream in the longitudinal direction (X-X) of axial extension of the screws and advancing movement of the mixture, at least three different sectors (30,40,50), which include:

an intake sector (30), which is adapted to capture the mixture fed from the outside and to push it downstream along the longitudinal direction (X-X) and which has a volume of the C-chambers forming the throughflow channel for passage of the flow which is constant over at least two pitches of the thread of each screw;

a transition sector (40), downstream of the intake sector, which has a volume of the C-chambers forming the flow channel which is variable, decreases and is smaller than the volume of the C-chambers of the intake sector;

a high-pressure sector (50), downstream of the transition sector, which has a volume of the C-chambers forming the flow channel which is constant over at least one pitch and smaller than the volume of the C-chambers of the intake and transition sectors, and is adapted to cause a compression of the mixture so as to obtain a maximum pressure of the mixture, and wherein at least one of the two screws is the screw according to claim 1.

10. The twin-screw assembly according to claim 9, wherein the two screws are in a mirror-image arrangement.

11. The twin-screw assembly according to claim 9, wherein the high-pressure sector has the volume of the C-chambers which is constant over at least two pitches of each screw.

12. The twin-screw assembly according to claim 9, wherein the intake sector has the volume of the C-chambers which is constant over at least four pitches of each screw.

13. The twin-screw assembly according to claim 9, wherein the transition sector has the volume of the C-chambers decreasing in a sense of advancing movement of the mixture, and/or cross-section of the throughflow channel for passage of the mixture flow decreasing in a sense of advancing movement of the mixture, according to a variation law which is at least partly approximately linear, quadratic, and/or of an order greater than 2.

14. The twin-screw assembly according to claim 9, wherein the two screws and the cylinder are arranged and configured to obtain an effective flowrate (Q) through the throughflow channel which is constant along the longitudinal direction of advancing movement of the mixture from the intake sector to an end of the high-pressure sector.

15. The twin-screw assembly according to claim 9, wherein:

in the intake sector:

$O'=(0.0025\text{-}0.030)D$;

$\delta=(0.0025\text{-}0.030)D$;

and/or in the high-pressure sector:

$O'=(0.0025\text{-}0.020)D$;

$\delta=(0.0025\text{-}0.030)D$;

and/or in the transition sector;

$O'=(0.0025\text{-}0.030)D$;

$\delta=(0.025\text{-}0.030)D$; and where O' is a distance between the crest of one screw and the core of the other screw and δ is a distance between the crest of one screw and the internal surface of the housing cavity of the containing cylinder.

16. The twin-screw assembly according to claim 9, wherein the upstream opening is configured to feed the elastomer mixture to the throughflow channel in a direction (Z-Z) substantially orthogonal to the longitudinal direction (X-X).

17. An elastomer mixture extruder, wherein the elastomer mixture extruder comprises a twin-screw assembly extending in the longitudinal direction (X-X) according to claim 9 and a downstream extrusion head (70).

18. The elastomer mixture extruder according to the claim 17, wherein the elastomer mixture extruder comprises a filtration zone provided with a mesh filter, downstream of the high-pressure zone (50), through which the elastomer mixture is made to pass.

19. A method for extruding an elastomer mixture, comprising the steps:

feeding the elastomer mixture to the twin-screw assembly according to claim 9 of a mixture extruder to form a throughflow channel for passage of elastomer mixture flow from upstream to downstream, consisting of the union of a plurality of C-chambers, each defined by the free volume between respective screws inside the cylinder and comprised in a single rotation of the thread for a single screw;

the elastomer mixture being fed inside the throughflow channel for passage of the elastomer mixture flow of the twin-screw assembly through the upstream opening (13);

capturing the elastomer mixture and pushing the elastomer mixture downstream through the throughflow channel for the elastomer mixture flow, in the intake sector (30) of the twin-screw assembly, which has the volume of the C-chambers forming the flow channel which is constant over at least two pitches of the thread of each screw;

advancing of the elastomer mixture through the transition sector (40) of the throughflow channel for passage of the mixture flow, the transition sector (40) being arranged downstream of the intake sector in the longitudinal direction (X-X) of axial extension of the screws and advancing movement of the elastomer mixture and having the volume of the C-chambers forming the flow channel which is variable, decreases and is smaller than the volume of the C-chambers of the intake sector;

advancing and the elastomer mixture in the high-pressure sector (50) which is arranged downstream of the transition sector and which has the volume of the C-chambers forming the flow channel which is constant over at least one pitch and smaller than the volume of the C-chambers of the intake and transition sectors to cause compression of the elastomer mixture and obtain a maximum pressure of the mixture;

passing the elastomer mixture at a maximum pressure through an extrusion head (60) arranged downstream of the high-pressure sector (50).

20. The method according to claim 19, further comprising filtering the elastomer mixture by passing the elastomer mixture through a mesh filter downstream of the high-pressure zone (50).

* * * * *